United States Patent [19]

Easley

[11] Patent Number: 5,647,683
[45] Date of Patent: Jul. 15, 1997

[54] AXLE AND TUBE YOKE ATTACHMENT

[75] Inventor: Paul D. Easley, Auburn, Ind.

[73] Assignee: Dana Corporation, Toledo, Ohio

[21] Appl. No.: 222,885

[22] Filed: Apr. 5, 1994

[51] Int. Cl.⁶ .................................................. F16D 1/068
[52] U.S. Cl. ..................... 403/359; 403/267; 403/282; 464/134; 464/182
[58] Field of Search ................. 403/359, 267, 403/298, 265, 282; 464/134, 182, 183, 149, 157

[56] References Cited

U.S. PATENT DOCUMENTS

| | | | |
|---|---|---|---|
| 1,779,805 | 10/1930 | Dunwoodie | 403/359 |
| 1,803,995 | 5/1931 | Chilton | 403/359 |
| 2,364,109 | 12/1944 | Taylor | 29/6 |
| 2,708,246 | 5/1955 | Dunn | 310/235 |
| 2,952,999 | 9/1960 | Glover | 464/182 |
| 3,360,961 | 1/1968 | Steiner | 403/359 X |
| 3,743,334 | 7/1973 | Witsenhausen-Adelman | 287/109 |
| 4,118,134 | 10/1978 | Mansel | 403/282 |
| 4,175,404 | 11/1979 | Schöpf | 64/9 R |
| 4,256,413 | 3/1981 | Abe | 403/282 |
| 4,279,275 | 7/1981 | Stanwood et al. | 138/109 |
| 4,292,001 | 9/1981 | Snell | 403/359 |
| 4,351,407 | 9/1982 | Call | 403/359 X |
| 4,376,333 | 3/1983 | Kanamaru et al. | 29/432 |
| 4,395,247 | 7/1983 | Roberts | 403/359 X |
| 4,663,819 | 5/1987 | Traylor | 29/432 |
| 4,701,068 | 10/1987 | Andrews et al. | 403/359 |
| 4,807,351 | 2/1989 | Berg et al. | 29/432 |
| 4,838,832 | 6/1989 | Schmitt et al. | 403/359 X |
| 4,875,796 | 10/1989 | Storm | 403/359 |
| 4,881,842 | 11/1989 | Farrell et al. | 403/261 X |
| 4,915,536 | 4/1990 | Bear et al. | 403/267 |
| 5,090,834 | 2/1992 | Yamamoto | 403/157 |

FOREIGN PATENT DOCUMENTS

| | | | |
|---|---|---|---|
| 62410 | 3/1990 | Japan | 403/359 |
| 3248727 | 11/1991 | Japan | 464/134 |
| 771366 | 10/1980 | U.S.S.R. | 403/359 |

Primary Examiner—Harry C. Kim
Attorney, Agent, or Firm—Oldham & Oldham Co., LPA

[57] ABSTRACT

A steerable drive axle includes an axle tube and tube yoke connected to one another as part of the drive assembly. The axle tube is secured at a first end to an axle gear carrier housing, with the second end connected to the tube yoke. The tube yoke includes a bore having an internal diameter flow with the plurality of first toothed splines. The axle tube has a plurality of corresponding toothed splines formed on the exterior surface thereof, with at least one of the first or second splines formed to extend along a helical path. The first and second splines are matingly engaged such that helix angle of the helical path creates an interference fit between the splines to retain the axle tube in a fixed position relative to the yoke.

8 Claims, 1 Drawing Sheet

5,647,683

AXLE AND TUBE YOKE ATTACHMENT

TECHNICAL FIELD

The invention is directed to a method and connection of a tube yoke to an axle tube associated with steerable driving axles in vehicles.

BACKGROUND OF THE INVENTION

The attachment of metallic axle tubes to tube yokes associated with a drive assembly have primarily utilized welding of the axle tube into the tube yoke. Conventionally, the axle tube has a smooth outer diameter with the yoke bore being smooth. Upon press fitting of the axle tube into the tube yoke, the axle tube outer diameter is circle welded at the inboard edge of the tube yoke. These welding procedures in the attachment of the axle tube to the tube yoke are relatively expensive and must be carried out with high precision. Further, the welding procedure requires the use of similar materials for the tube yoke and axle tube as the welding of dissimilar materials is difficult and frequently will result in galvanic corrosion.

SUMMARY OF THE INVENTION

Based upon the foregoing, it is an object of this invention to provide an improved construction and method of attaching the axle tube to the tube yoke on steerable driving axles without welding of the two members where they are joined. The invention therefore provides a drive assembly having a tube yoke with a bore to receive and be coupled with an axle tube, with the two members being coupled by means of an interference fit without welding between the members. The tube and yoke assembly is thereafter fitted and assembled to an axle gear carrier housing in a conventional manner. The invention therefore avoids costly welding procedures, and enables dissimilar materials to be used for the tube yoke and axle tube without the possibility of corrosion between the members.

In general, the invention comprises an axle tube and yoke spline connection as part of a drive assembly. An axle tube having a longitudinal axis has its first end secured to the axle gear carrier housing, with a second end connected to the tube yoke as part of the drive assembly. The axle tube has a plurality of corresponding first toothed splines formed on the exterior surface thereof. The tube yoke includes a bore having an internal diameter formed with a plurality of second toothed splines. Either the first or second splines are formed to extend substantially parallel to the longitudinal axis of the axle tube while the other of the splines are formed to extend along a helical path. The first and second splines are matingly engaged such that the helix angle of the helical path on one of the splines creates an interference fit between the mating splines to retain the axle tube in operative connection with the tube yoke. The invention further comprises a method of connecting an axle tube to a tube yoke in a vehicle drive assembly which comprises the steps of forming a length of external splines on the outer surface of an axle tube at a first end, the external splines having a predetermined orientation with respect to the length of the axle tube. Thereafter, mating splines are formed on the inner surface of the tube yoke bore. At least one set of spline is formed to extend along a helical path in an orientation different from that of the other set of splines. The axle tube is inserted within the bore of the tube yoke with predetermined force to create an interference fit between the helically oriented splines and other set of splines to retain the axle tube in operative connection to the tube yoke.

BRIEF DESCRIPTION OF THE DRAWINGS

The objects, features, and advantages of the invention will become apparent upon reading the following detailed description taken in conjunction with the accompanying drawings, wherein.

DETAILED DESCRIPTION OF THE INVENTION

Figure 1:
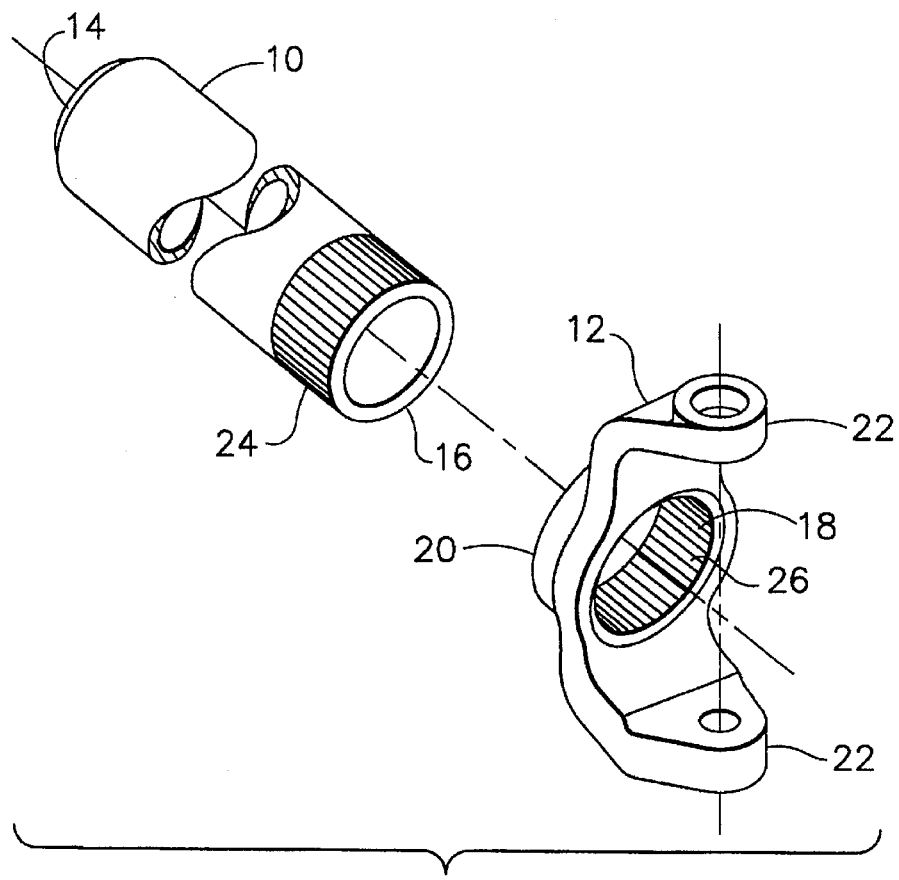
FIG. 1 shows a partial perspective and exploded view of the connection and of the axle tube and tube yoke section.

Referring to the drawings, an axle tube 10 forming part of a steerable driving axle of a vehicle, is to be attached to a tube yoke 12. The axle tube 10 may be fabricated of steel or other suitable material, while the tube yoke may be made of a dissimilar material such as cast iron. Axle tube 10 has a first end 14 which is coupled to an annular trunnion flange associated with a differential case of the axle assembly. A second end 16 is insertable into a bore 18 formed a hub 20 associated with the tube yoke 12. Extending from hub 20 are a pair of yoke ears 22, which permit coupling of the tube yoke 12 to a vehicle wheel end as understood by those skilled in the art. The end 16 of axle tube 10 includes a length of toothed serrations or splines 24 formed on the external surface adjacent end 16 of the axle tube 10. Similarly, the bore 18 formed in hub 20 of tube yoke 12 includes a mating internally splined portion 26 for securing the connection end 16 of axle tube 10 therein. The end 16 of axle tube 10 is secured within tube bore 18 by means of interference fit between the mating splines 24 and 26 with a few thousandths of an inch press-fit tolerance. The interference fit between axle tube 10 and tube yoke 12 will accommodate large torques applied to the assembly.

For a proper interference fit between the externally splined surface 24 of axle tube 10 and internally splined section 26 of the tube yoke 12, one of the sections of toothed serrations 24 or 26 is formed with a slight helix angle as compared to the other set of serrations in the connection. For example, as shown in FIG. 1, the splines 24 of axle tube 10 are formed in a helical path with a curvature within a range of up to 1° of helix angle, with a preferred helix angle of 15' of 1°. The mating splines 26 associated with tube yoke 12 are configured as straight splines such that upon insertion of the axle tube end 16 into the bore 18, the interference fit between the splined sections will couple axle tube 10 and tube yoke 12 to prevent axial or rotational relative movement between these members. The slight helix angle associated with one of the splined sections provides increasing interference between the splines as the end of axle tube 10 is inserted into the tube yoke bore 18.

As another example, each of the toothed serrations 24 and 26 may be formed with the helix angle, with the helical paths formed by the tooth splines being opposed to one another such that upon mating engagement of the first and second splines 24 and 26, the helix angle of each helical path will create an interference fit between the splines 24 and 26 to retain the axle tube 10 in a fixed position relative to the tube yoke 12.

Figure 2:
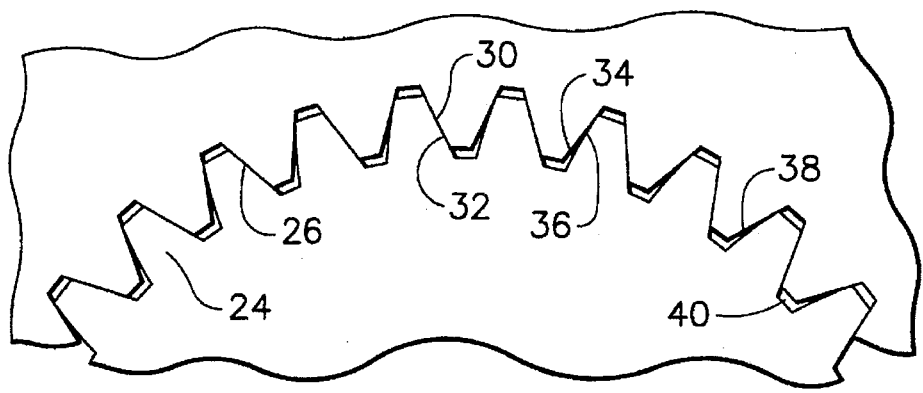
FIG. 2 is a cross-sectional view taken along the mating connection between the axle tube and tube yoke shown in of FIG. 1.

As seen in FIG. 2, in this example, the helical splines 24 form an interference fit with internal splines 26 of tube yoke 12. The slight helical angle of splines 24 creates an interference fit between a first side 30 of the external splines 24 and a side 32 of internal splines 26, as well as an interference fit along a portion of the opposite spline side 34 with opposite spline side 36 associated with the axle tube 10 and tube yoke 12 respectively. The slight helix angle of splines 24 provides a small space 38 between the interference fit of the splines 24 and 26 upon mating of the splines. Within the small spaces 38, an adhesive material may be provided to insure rigid securing of the axle tube 10 to the tube yoke 12. The small void spaces created by the interference fit of the splines allows introduction of a suitable adhesive material for adherence of the splines to one another in this manner. One suitable adhesive for use in securing the axle tube 10 to a tube yoke 12 is a high strength anaerobic sealant for metallic members, such as "PermaBond HHO4O" produced by National Starch and Chemical Corporation.

In a preferred manufacturing process, the axle tube 10 is formed from steel, and the length of splines 24 are rolled onto the external diameter of the tube 10. Similarly, the tube yoke 12 is formed from a cast iron blank, and the internal diameter of the hub 20 is broached with splines 26. An amount of the adhesive or sealant may then be applied to splines 24 on the axle tube 10, and the end 16 is inserted into the bore 18 so that splines 24 matingly engage splines 26. Upon insertion of the axle tube 10 into tube yoke 12, the adhesive will be spread over the interface region of splines 24 and 26 to substantially fill the void spaces 38 upon establishing a suitable interference fit. After curing or drying of the adhesive 40, the connected axle tube and yoke assembly would be fitted with appropriate spring seat and suspension brackets and thereafter assembled to the axle gear carrier housing. The upper and lower yoke ears 22 of the tube yoke 12 are thereafter fitted with ball sockets, pin joints, or king pins while the yoke provides clearance for the shaft joint in the conventional manner for steerable driving axles.

The axle tube and tube yoke attachment provides a connection which will accommodate the expected torque loading associated with the drive axle. The connection and method of assembly do not require welding, and therefore dissimilar materials may be used for the axle tube 10 and tube yoke 12. This simplifies manufacture and results in costs savings in the assembly.

Although only one presently preferred embodiment and method of assembly have been shown and described herein, numerous other alternatives or modifications would occur to one of ordinary skill and are within the spirit and scope of the invention as described in the appended claims.

What is claimed is:

1. An axle tube and tube yoke connection assembly as part of a steerable drive axle, comprising:

an axle tube formed of a first material having first and second ends and a longitudinal axis, said first end adapted for securing to an axle gear carrier housing and said second end being connected to a tube yoke formed of a second material, said axle tube having a length of first toothed splines formed on said second end and said tube yoke having a hub portion with a bore having an internal diameter therethrough, said internal diameter of said bore being formed with second toothed splines, wherein at least one of said first or said second splines are formed to extend along a helical path having a predetermined helix angle, with said first and said second splines matingly engaged to form a connection between said axle tube and said tube yoke such that said helix angle of said helical path creates an interference fit between said first and said second splines, whereby said interference fit creates a plurality of void spaces between the matingly engaged first and second splines, with each of said void spaces being formed between each tooth of said first and said second splines by a first side of said each tooth of said first splines engaging a corresponding first side of said each tooth of said second splines along a first engaging surface thereof and a second side of said each tooth of said first splines engaging a corresponding second side of said each tooth of said second splines along a second engaging surface thereof, wherein said first engaging surface is larger than said second engaging surface, and said interference fit having sufficient strength to retain said axle tube in a fixed position relative to said tube yoke and wherein said connection between said axle tube and said tube yoke accommodates torque loads applied through said axle tube to said tube yoke.

2. The axle tube and tube yoke connection assembly of claim 1, wherein said tube yoke is formed of a non-heat treated cast iron material.

3. The axle tube and tube yoke connection assembly of claim 1, wherein said axle tube is formed of a steel material.

4. The axle tube and tube yoke connection assembly of claim 1, wherein said helix angle is less than 1°, defining said interference fit in a tolerance range of 0.002 of an inch.

5. The axle tube and tube yoke connection assembly of claim 4, wherein said helix angle is 15 minutes of 1°.

6. The axle tube and tube yoke connection assembly of claim 1, wherein an adhesive is applied between said first and second toothed splines so as to substantially fill said void spaces and further secure said first and said second toothed splines together in said fixed position.

7. The axle tube and tube yoke connection assembly of claim 1, wherein said first toothed splines are formed to extend along said helical path and said second toothed splines are formed to extend along a helical path having a helix angle which is opposed to the helical path of said first tooth splines such that upon mating engagement of said first toothed splines and said second toothed splines, the helix angles of said helical paths create said interference fit between said first and said second splines to retain said axle tube in said fixed position relative to said tube yoke.

8. The axle tube and tube yoke connection assembly of claim 1, herein said first and said second materials are dissimilar.

* * * * *